Patented Sept. 30, 1952

2,612,495

UNITED STATES PATENT OFFICE 2,612,495

STABILIZED DIAZONIUM SALTS AND PROCESS OF EFFECTING SAME

William H. von Glahn, Loudonville, and Herman A. Bergstrom, Albany, N. Y., assignors to General Aniline & Film Corporation, New York, N. Y., a corporation of Delaware No Drawing. Application December 29, 1948, Serial No. 68,073

8 Claims. (Cl. 260—142)

This invention relates to the preparation of stable diazonium compounds and refers particularly to the production of non-dusting diazonium salts or Fast Color Salts of abnormal grain or particle size which can be used effectively as dye intermediate.

In the preparation of diazonium salts, the diazo compound, as produced by diazotization of a primary amine, is generally stabilized by forming (1) a complex double salt of the diazonium chloride with an inorganic salt, such as zinc chloride, tin chloride, cadmium chloride, manganese chloride or sodium fluoroborate, (2) aromatic or aliphatic sulfonates, (3) acid salts such as sulfates and chlorides. These are known in the trade as Fast Color Salts (see Saunders, "The Aromatic Diazo Compounds," p. 29, London, 1936), and the salts and acids combined therein with the diazonium compounds are herein referred to as "Fast Color Salt stabilizers." In many cases the stabilized diazonium salts thus obtained have fine grain crystals which filter very poorly, due to the particle size, and result in a large proportion of water in the filter cake. The dried product creates dusting problems during grinding and in subsequent processing steps, such as measuring, pouring and packaging and use in dye house. In addition to the dusting problems arising during the processing of these diazonium salts, the fine dust particles so created are a work hazard in the form of possible skin irritations and other health hazards among the workers.

It has now been found that improved stabilized diazonium compounds may be obtained by first reacting the diazotization product with a surface active agent, thereby effecting a partial stabilization of the diazonum compound with the surface active agent, and then effecting the remainder of the stabilization with one of the usual Fast Color Salt stabilizers mentioned above. The surface active agents which have been found effective are those of the anionic reactive group wherein the surface active agent contains an aliphatic hydrophobic group or an alkyl-aromatic hydrophobic group and an aromatically linked hydrophilic group. Included in this group are surface active alkyl mono and diaryl sulfonates, carboxylates, and phosphates, which may be further substituted on the alkyl and aryl radicals. These aromatic surface active agents may be represented by the formula

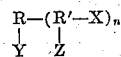

where R is an alkyl radical; R' an aryl radical; X is a hydrophilic group such as those of the class consisting of the sulfonate, carboxylate and phosphate radicals; $n$ is 1 or 2; and Y and Z represent hydrogen or substituent groups such as halogens, nitro, alkyl such as methyl, ethyl and propyl and alkoxy such as methoxy and ethoxy.

The diazonium compounds stabilized by the surface active agents and the salts or acids generally employed as stabilizing agents in Fast Color Salts such as metallic chlorides, particularly the mercury, iron, zinc, cadmium, tin, antimony, platinum, gold, copper and arsenic chlorides, naphthalene sulfonic acids such as naphthalene-1,5-disulfonic acid, and fluoroboric acid are prepared by introducing a solution of the surface active agent into the diazotization solution. The combined diazo solution and surface active agent solution is then mixed with a solution containing the additional stabilizing agent. The exact order of mixing the reactants is not material, although it is preferable to initially mix the diazonium compound and the surface active agent. Thus the diazo and surface active agent can be combined first and the combined solutions added to a solution of the Fast Color Salt stabilizer (such as $ZnCl_2$); the Fast Color Salt stabilizer can be added to the mixture of the diazo plus the surface active agent; the diazo and the surface active agent may be run into the solution of the Fast Color Salt stabilizer simultaneously; or the latter may be added to the diazo solution prior to the surface active agent provided that the diazo solution is kept sufficiently dilute to prevent precipitation of the stabilized diazo before the surface active agent can act on it. When partial stabilization is effected with the surface active agents and stabilization completed with metallic chlorides or other known stabilizers, the stabilized diazonium salts precipitate out with a crystal structure which is distinguished from that of the crystal structures of diazonium salts produced from the same diazonium compounds but stabilized only with the usual or conventional stabilizers, i. e., the metallic chlorides, naphthalene sulfonic acids and fluoroboric acid. This new crystal growth results in most cases either in the formation of larger crystals which may be different in structure from the crystal structure of the corresponding conventionally stabilized diazonium salts or in a change of degree of crystal aggregation, usually forming a greater degree of aggregation. In either case the product can be handled with greater ease and the solutions more efficiently filtered. It is also characteristic of the diazonium compounds stabilized in accordance with this invention that a greater degree of initial dryness is present in the filter cake.

The stabilization of the diazonium salts by means of the surface active agents of this invention thus results in an appreciable reduction of the water content of the filtered diazo cake, as a direct result of the change in crystal pattern or formation of larger crystals or crystal aggregates. As compared with ordinary Fast Color Salts which are stabilized only with the usual metallic salts, less water is held by the stabilized diazonium salts of this invention than is held by the Fast Color Salts, the comparative ratio being in the range of 25 to 50% for the conventionally stabilized diazonium salts to 5 to 15% for the diazonium salts stabilized in accordance with this invention. In order to obtain these results appreciable amounts of the surface active agent are used. A molar ratio of at least 5% and preferably from about 5 to 20% of the surface active agent based on the amount of the diazonium compound is employed. After filtering and drymixing of the filter cake it may be noted that the dusting characteristic of the dry powdered product is decreased to a considerable degree and in many cases the resulting Fast Color Salts are rendered completely non-dusting. The resistance of the resulting stabilized diazonium salts or Fast Color Salts to decomposition during storage is also greatly improved by the use of the surface active agents.

In order to inhibit decomposition of stabilized diazonium salts during storage, it is necessary that they be kept as dry as possible. This is accomplished generally by admixing with the stabilized diazonium salts anhydrous agents, such as the anhydrous sodium sulfate, anhydrous magnesium sulfate and partially dehydrated aluminum sulfate mentioned above. These compounds combine with water to form water of crystallization and thus keep the diazonium salts dry. The less water initially present in the filter cake the smaller the amount of dehydrating agent which must be used. In view of the large crystal structure or increased crystal aggregate formation resulting from the partial surface active compound stabilization of this invention, the filter cake contains only a fraction of the water which is present in the same diazonium salt stabilized by the usual complex salt formation with such compounds as $ZnCl_2$ and hence requires smaller amounts of the dehydrating agents. Also, the necessity for rigorous oven drying is eliminated in those cases where the Fast Color Salts stabilized with the usual stabilizers retain a large amount of water. In such cases it is normally necessary not only to hydraulically press them, but also to pre-dry them in ovens heated to approximately 40° C. for from 12 hours to 2 days in order to bring down the water content. Only after such rigorous drying treatment can they be dry mixed in the usual way. In the case of the surface active agent stabilized diazonium compound of this invention the stabilized diazonium salt will be in such a form that only a fraction of the water is retained. Hence dry mixing can be effected immediately with the dehydrating agents and the danger of at least partial decomposition of the diazo compound due to exposure to excessive heat for long periods of time is averted.

The following examples will serve to more fully illustrate this invention. It is understood, however, that the invention is not limited to the specific conditions obtaining in these examples which are intended to be illustrative of the best manner to effect the products. Unless otherwise stated, the parts are by weight.

*Example 1*

32.4 gr. of 2,5-dichloroaniline are slurried with 46 cc. of water and then heated to 60° C. While applying fast agitation 78 cc. of hydrochloric acid (21° Bé.) are added over a 10 minute period.

The above mixture is then cooled to 0° C. and 30 cc. of water added. 13.8 gr. of 100% sodium nitrite are added as a 33% solution, care being taken that the temperature does not rise above +10° C. An excess nitrite test is maintained for one-half hour, using starch-iodide paper. The solution is then clarified by adding charcoal and filtered.

10 gr. of the surface active agent known as Daxad II, which is a commercial methylene di-(alkylaryl sodium sulfonate), are dissolved in 20 cc. water and the resulting solution added to the diazotization solution.

13.6 gr. $ZnCl_2$ dissolved in a small amount of water are then added to the resulting solution. The resulting diazo salt is salted out with sodium chloride equivalent to 10% of the volume, filtered, sucked dry, dry mixed and standardized with sodium sulfate, aluminum sulfate and calcined magnesium sulfate.

The product obtained from this example has a coarser crystalline structure and a different crystal growth than the product obtained in a similar manner without the addition of the surface active agent. Because of this coarser crystalline structure the filter cake has a higher degree of initial dryness, thus requiring addition of smaller amounts of the drying compounds used in dry mixing. It has practically no tendency to dust.

*Example 2*

The following mixture is slurried for 2 to 3 hours:

76 cc. water
50 cc. hydrochloric acid (21° Bé.)
31.5 gr. 5-chloro-o-anisidine

The mixture is cooled to −10° C. and 13.8 gr. of 100% sodium nitrite are added as a 33% solution. After diazotization is complete as determined by the excess nitrite test using starch-iodide paper, 15 gr. of the surface active agent known as Alkanol B, which is a commercial alkylnaphthalene sodium sulfonate, are added to the diazotization solution. A solution of 13.6 gr. $ZnCl_2$ in a small amount of water is then added. The product is salted out, dried and standardized as in Example 1.

The product obtained in accordance with this example has a coarser crystalline structure than the product obtained in a similar manner but without the addition of the surface active agent. Because of this coarser crystalline structure the filter cake has a higher degree of initial dryness, thus requiring the addition of smaller amounts of the drying compounds used in dry mixing and lessening the tendency to dust of the dry particles.

*Example 3*

The following mixture is agitated rapidly at a temperature of 60° C.:

32.4 gr. 2,5-dichloroaniline
46 cc. water
78 cc. hydrochloric acid (21° Bé.)

The temperature of the solution is then reduced to 0° C. and an additional 30 gr. of ice are added while adding 13.8 gr. of 100% sodium nitrate as a 33% solution.

After diazotization is complete as determined by the excess nitrite test using starch-iodide paper, 20 gr. of the surface active agent known as Aresket 100, which is a commercial monobutyldiphenyl monosulfonate having the formula

are added, followed by the addition of 10 gr. of $ZnCl_2$ dissolved in a small amount of water.

The resulting diazo compound is salted out with sodium chloride equivalent to 10% of the volume, filtered, sucked dry and dry mixed with sodium sulfate, aluminum sulfate and calcined magnesium sulfate.

The product obtained from this example has a coarser crystalline structure than the product obtained in a similar manner but without the addition of the surface active agent. The filter cake has a higher degree of initial dryness, thus requiring less drying agent. The dry product has less tendency to dust.

*Example 4*

33.6 gr. of 5-nitro-o-anisidine are slurried with 46 cc. water and heated to 60° C. While applying rapid agitation, 78 cc. hydrochloric acid (21° Bé.) are added over a 10 minute period. The mixture is then cooled to 0° C. and 30 cc. water added. 13.8 gr. of 100% sodium nitrite are added as a 33% solution.

After diazotization is complete as determined by the excess nitrite test using starch-iodide paper, the solution is clarified with charcoal and filtered.

10 gr. of the surface active agent known as Daxad 11, a commercial methylene di(alkylaryl sodium sulfonate) are dissolved in 20 cc. water and this solution added to the diazotization solution.

13.6 gr. $ZnCl_2$ dissolved in a small amount of water are added to the resulting solution.

The diazo compound resulting from the reaction of the $ZnCl_2$, the surface active agent and the diazotization product is salted out with sodium chloride equivalent to 10% of the volume, filtered, sucked dry, dry mixed and standardized with sodium sulfate, aluminum sulfate and calcined magnesium sulfate.

The product obtained in accordance with this example has a coarser crystalline structure and a different crystal growth than the product obtained in a similar manner without the addition of the surface active agent. Because of this coarser crystalline structure the filter cake has a higher degree of initial dryness, thus requiring the addition of smaller amounts of the drying compounds used in dry mixing. There is practically no tendency of the dried product to dust.

*Example 5*

32.4 gr. of 2,5-dichloroaniline are slurried with 46 cc. water and heated to 60° C. While applying rapid agitation, 78 cc. hydrochloric acid (21° Bé.) are added over a 10 minute period. The mixture is cooled to 0° C. and 30 cc. of water are added. 13.8 gr. of 100% sodium nitrite are then added as a 33% solution.

After diazotization is complete as determined by the excess nitrite test using starch-iodide paper, the solution is clarified by the addition of charcoal and filtered.

10 gr. of the surface active agent known as Santomerse D, a commercial decylbenzene sodium sulfonate, are dissolved in 20 cc. water and added to the diazotization solution. 13.6 grams $ZnCl_2$ dissolved in a small amount of water are then added. The resulting diazo compound obtained by reaction of the $ZnCl_2$, the surface active agent and the diazotization product is salted out with sodium chloride equivalent to 10% of the volume, filtered, sucked dry, dry mixed and standardized with sodium sulfate, aluminum sulfate and calcined magnesium sulfate.

The product thus obtained has a coarser crystalline structure and a different crystal growth than the product obtained in a similar manner without the addition of the surface active agent. Because of this coarser crystalline structure, the filter cake has a higher degree of initial dryness, thus requiring the addition of smaller amounts of the drying compounds used in dry mixing. There is practically no tendency of the dry product to dust.

Other surface active agents such as Santomerse #3, which is a commercial dodecylbenzene sodium sulfonate, or Santomerse #1, which is a long chain alkylbenzene sodium sulfonate, may be substituted for the Santomerse D surface active agent of this example with analogous results.

*Example 6*

The following mixture is slurried for 2 to 3 hours:

76 cc. water
50.6 cc. hydrochloric acid (21° Bé.)
30.4 gr. 2-nitro-p-toluidine

The mixture is cooled to −10° C. and 13.8 grams of 100% sodium nitrite are added as a 33% solution. The temperature is kept below 10° C. until diazotization is complete as determined by the excess nitrite test using starch-iodide paper.

A solution of 10 gr. of the surface active agent known as Tamol NNO, which is a commercial sulfonated methylenebinaphthalene of the formula

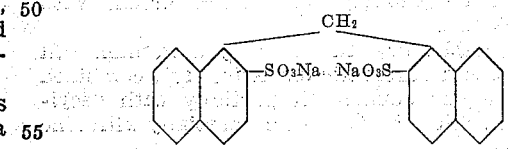

in 100 cc. of water is added slowly to the diazotization solution. 12 gr. $ZnCl_2$ dissolved in 10 cc. of water are then added to the resulting solution. A very noticeable change of crystal habit takes place. Normally the $ZnCl_2$ stabilized diazo of this product produces long crystals with indented ends. When Tamol NNO is present, the crystals change to a hexagonal form or actually become round.

The coarser crystalline structure resulting from this change in crystal formation produced by the addition of the surface active agent effects a higher degree of initial dryness in the filter cake as compared with the same product obtained without the addition of the surface active agent. Smaller amounts of drying compounds may thus be used in dry mixing and the dry product has practically no tendency to dust.

Example 7

The following mixture is slurried for 2 to 3 hours:

76 cc. water
50.6 cc. hydrochloric acid (21° Bé.)
30.4 gr. 2-nitro-p-toluidine

This mixture is cooled to −10° C. and 13.8 gr. of 100% sodium nitrite are added as a 33% solution. The temperature is kept below 10° C. until diazotization is complete as determined by the excess nitrite test using starch-iodide paper.

A solution of 12 gr. of the surface active agent known as Nacconol NR, a commercial alkylaryl sulfonate having a single long chain alkyl radical, in 100 cc. of water is added slowly. 12 gr. of ZnCl₂ dissolved in 10 cc. of water are then added. The resulting diazo compound is salted out with sodium chloride equivalent to 10% of the volume, filtered, sucked dry, dry mixed and stabilized with sodium sulfate, aluminum sulfate and calcined magnesium sulfate.

The product obtained in accordance with this example has a coarser crystalline structure than the product obtained in a similar manner but without the addition of the surface active agent. Because of this coarser crystalline structure, the filter cake has a higher degree of initial dryness, thus requiring the addition of smaller amounts of the drying compounds used in dry mixing and reducing the tendency to dust of the dry particles.

Similar results are obtained by substituting 15 gr. of the surface active agent known as Nekal A, which is a commercial sodium hexylnaphthalene sulfonate, for the Nacconol NR surface active agent of this example.

We claim:

1. A stable, dry, non-dusting diazonium salt comprising an aromatic diazonium salt combined as a complex double salt partially with monobutyldiphenyl monosulfonate of the formula

and partially with zinc chloride.

2. A stable, dry, non-dusting diazonium salt comprising an aromatic diazonium salt combined as a complex double salt partially with a sulfonated methylenebinaphthalene and partially with zinc chloride.

3. A stable, dry, non-dusting diazonium salt comprising an aromatic diazonium salt combined as a complex double salt partially with decylbenzene sodium sulfonate and partially with zinc chloride.

4. In a process for the preparation of a stable aromatic diazonium salt in solid form which involves precipitation of an aromatic diazonium salt from aqueous solution with a Fast Color Salt stabilizer, the improvement which comprises adding to the aqueous solution of said diazonium salt, prior to said precipitation, a substantial amount of an anionic surface-active agent containing a hydrophobic group selected from the class consisting of aliphatic hydrophobic groups and alkyl-aromatic hydrophobic groups, and an aromatically linked hydrophilic group, and effecting the aforesaid precipitation of the stabilized diazonium salt in solid form in the presence of said surface-active agent, to form a complex diazonium double salt partly with said anionic surface-active agent and partly with the Fast Color Salt stabilizer.

5. In a process for the preparation of a stable diazonium salt in solid form which involves precipitation of an aromatic diazonium salt from aqueous solution with a Fast Color Salt stabilizer, the improvement which comprises adding to the aqueous solution of said diazonium salt, prior to said precipitation, an anionic surface-active agent containing a hydrophobic group selected from the class consisting of aliphatic hydrophobic groups and alkyl-aromatic hydrophobic groups, and an aromatically linked hydrophilic group, the surface-active agent being added in an amount equal to at least 5% of the amount of the diazonium salt, and effecting the aforesaid precipitation of the stabilized diazonium salt in solid form in the presence of said surface-active agent, to form a complex diazonium double salt partly with said anionic surface-active agent and partly with the Fast Color Salt stabilizer.

6. A stable, dry, non-dusting diazonium composition comprising an aromatic diazonium salt combined as a complex double salt partially with an anionic surface-active agent containing a hydrophobic group selected from the class consisting of aliphatic hydrophobic groups and alkyl-aromatic hydrophobic groups, and an aromatically linked hydrophilic group, and partially with a Fast Color Salt stabilizer, said complex double salt having a crystalline form such that it retains less water in a filter cake upon filtration of an aqueous suspension thereof than a filter cake of the corresponding aromatic diazonium salt combined as a complex double salt solely with said Fast Color Salt stabilizer.

7. A stable, dry, non-dusting diazonium composition comprising an aromatic diazonium salt combined as a complex double salt partially with an anionic surface-active agent containing a hydrophobic group selected from the class consisting of aliphatic hydrophobic groups and alkyl-aromatic groups, and an aromatically linked hydrophilic group, and partially with a Fast Color Salt stabilizer, the surface-active agent being present in an amount equal to at least 5% of the amount of the diazonium salt, said complex double salt having a crystalline form such that it retains less water in a filter cake upon filtration of an aqueous suspension thereof than a filter cake of the corresponding aromatic diazonium salt combined as a complex double salt solely with said Fast Color Salt stabilizer.

8. The stable, dry, non-dusting diazonium composition of claim 6 wherein the anionic surface-active agent contains at least one sulfonic acid group as the aromatically linked hydrophilic group.

WILLIAM H. von GLAHN.
HERMAN A. BERGSTROM.

REFERENCES CITED

The following references are of record in the file of this patent:

UNITED STATES PATENTS

| Number | Name | Date |
|---|---|---|
| 1,846,113 | Johner | Feb. 23, 1932 |
| 2,121,616 | Werntz | June 21, 1938 |
| 2,196,985 | Flett | Apr. 16, 1940 |
| 2,498,722 | Straley | Feb. 28, 1950 |

FOREIGN PATENTS

| Number | Country | Date |
|---|---|---|
| 273,352 | Great Britain | June 27, 1927 |